July 11, 1961  D. W. LAVIANA  2,992,370
ELECTRICAL COIL STRUCTURE
Filed Sept. 11, 1956  2 Sheets-Sheet 1

INVENTOR.
Donald W. Laviana
BY
D. C. Staley
His Attorney

July 11, 1961

D. W. LAVIANA 2,992,370

ELECTRICAL COIL STRUCTURE

Filed Sept. 11, 1956

INVENTOR.
Donald W. Laviana
BY
D. C. Staley
His Attorney

United States Patent Office 2,992,370
Patented July 11, 1961

2,992,370
ELECTRICAL COIL STRUCTURE
Donald W. Laviana, Rochester, N.Y., assignor to General Motors Corporation, Detroit, Mich., a corporation of Delaware
Filed Sept. 11, 1956, Ser. No. 609,274
6 Claims. (Cl. 317—158)

This invention pertains to an electrical coil assembly, and particularly to an improved coil construction and method of making the same.

Heretofore, most electric coils for solenoids, or relays, have been constructed with a separate terminal block assembly which is taped to the winding. The ends of the winding are wrapped around the terminals and, thereafter, individually soldered to effect the desired mechanical and electrical connection. The present invention relates to a coil assembly wherein the terminals are secured to tabs on the end flanges of the spool, or bobbin, about which the coil is wound. Consequently, the ends of the winding can be directly secured to the terminals, and the terminal construction is such that the ends of the winding can be secured to the terminals by a dip soldering process. Thereafter, the end tabs are bent inwardly and secured to the winding by tape. Accordingly, among my objects is the provision of an improved electric coil assembly; the further provision of an improved spool and terminal assembly for electric coils; and the still further provision of a method of assembling an electric coil having the unique spool and terminal assembly of this invention.

The aforementioned and other objects are accomplished in the present invention by attaching preformed terminals, having portions disposed at an angle to each other, to radially extending tabs on the end flanges of a spool. Specifically, in one embodiment, the spool, or bobbin, is composed of insulating material and includes a core having a flange at each end. Each flange has a radially extending tab that extends beyond the periphery of the coil assembly before and immediately after the wire is wound on the core. The end flanges are notched adjacent to the edges of the tab, and each tab may be formed with a bend-line to facilitate folding of the tabs inwardly after the ends of the winding are attached to the initially radially extending terminal portions. Thereafter, tape is wound around the tabs in the customary manner to provide insulation for the exposed portion of the winding and to provide the necessary mechanical strength to produce a firm coil assembly.

In coil designs for high voltage applications, a thin piece of insulation conforming approximately to the curvature of the coil may be inserted between the radially extending tabs so that it will lie immediately between the terminals and the winding after the tabs have been bent inwardly to engage the winding. Moreover, in cases where the spool prohibits the installation of the terminals in alignment with each other, the tabs may be displaced angularly with respect to each other so that when the tabs have been bent inwardly towards the windings, the terminals and tabs will be circumferentially spaced about the winding. In addition, a second flange of dielectric material located outwardly of the flange having the tabs thereon, may be provided to assure proper insulation characteristics at the point where the notches are formed in the end flanges having the terminals.

In some instances, the spool is designed to have wound therearound two coil assemblies, in which instance each end flange is formed with a pair of angularly spaced radially extending tabs to which terminals are attached. In a further modification, the end flanges of the spool may be formed with a pair of angularly spaced, radially extending tabs and a terminal may be attached to only one of the tabs. In this arrangement, the tab without the terminal on one end flange is bent inwardly to engage the winding of the coil, and the tab having the terminal attached thereto is bent, or super-imposed, on this tab to provide the necessary insulation between the winding and the terminal. In all modifications, the core of the spool is formed with a pair of diametrically opposed notches adjacent each end which receive radially extending tangs formed on the end of the flanges. The extending portions of the core are thereafter spun around the flanges to form the bobbin, or spool assembly.

The method of assembling the coil construction of this invention includes the steps of attaching the terminals to the tabs on the end flanges of the spool; winding one end of the wire around the extended portions of one of the terminals; winding the wire about the core which is mounted on a spindle or other rotating element, in the usual manner; wrapping the other end of the wire around the extended portion of the other terminal; dipping the radially extending terminal portions with the coil ends wrapped therearound into a soldering pot to obtain a good mechanical and electrical connection; bending the tabs having the terminals attached thereto inwardly through an angle of substantially 90°; and taping the tabs and terminal portions to the winding in the customary manner.

The completed coil assembly has terminal portions extending radially from the winding for connecting to an external circuit. Moreover, the coil assembly is extremely rugged, and it has been found that substantial manufacturing economies can be realized by assembling coils in the manner taught by this invention.

Further objects and advantages of the present invention will be apparent from the following description, reference being had to the accompanying drawings wherein preferred embodiments of the present invention are clearly shown.

Figure 1:
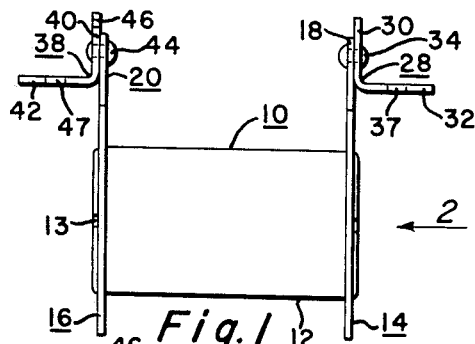
FIGURE 1 is a view, in elevation, of the spool and terminal assembly of this invention.
Figure 2:
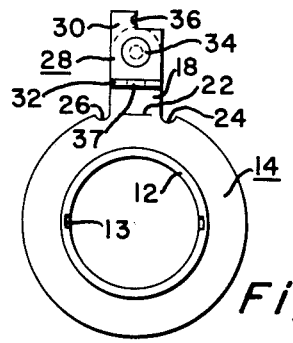
FIGURE 2 is an end view taken in the direction of arrow 2 of FIGURE 1.

With particular reference to FIGURE 1, the coil assembly of this invention includes a unique spool and terminal assembly designated generally by the numeral 10. The spool and terminal assembly comprises a core 12 of insulating material having diametrically opposed notches adjacent each end thereof. As shown in FIGURE 1, the core 12 receives a pair of end flanges 14 and 16 of insulating material having a central aperture with a pair of diametrically opposed inwardly extending tangs thereon. The notches in the core 12 are depicted by the numeral 13 in the drawings. After the end flanges 14 and 16 are positioned over the ends of the core 12, the extending ends of the core 12 are spun over to produce the core assembly 10. The end flanges 14 and 16 are also formed with radially extending tabs 18 and 20, respectively. As seen in FIGURE 2, tab 18 on flange 14 is formed with a bend-line 22, and the periphery of the flange 14 is notched at 24 and 26 adjacent the sides of the tab 18. The tab 20 on the end of the flange 16 is of identical construction.

A terminal connector 28 having portions 30 and 32 located at substantially right angles to each other, is attached to the tab 18 by means of the rivet 34. The terminal portion 30 which is initially located radially to the core 12, has a notch 36 in one edge thereof within which one end of the winding, to be described, is wrapped around. The portion 32 of the terminal 28 is formed with an opening 37 to which an external circuit can be connected.

A terminal 38 of identical construction to the terminal 28 is attached to the tab 20 of the flange 16 by means of a rivet 44. The terminal 28, thus, includes portions 40 and 42 located at substantially right angles to each other, the portion 40 having a notch 46 and receiving the other end of the winding. The portion 42 has a hole 47 therein for connection to an external circuit. The terminals 28 and 38 are preformed into the shape shown in FIGURES 1 and 2.

Figure 3:
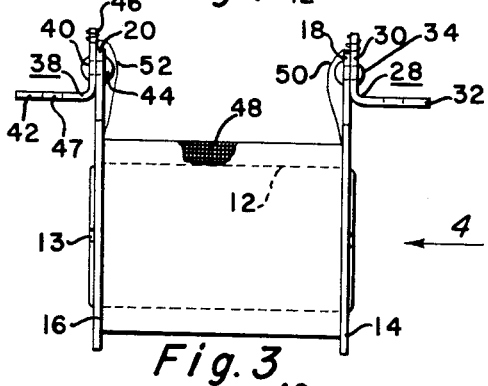
FIGURE 3 is a view, partly in section and partly in elevation, of the spool having a winding thereon.
Figure 4:
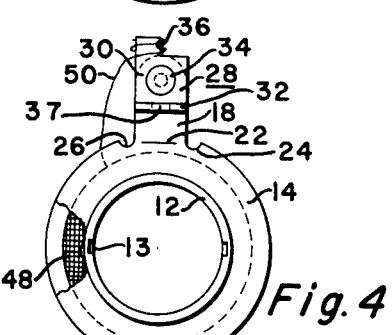
FIGURE 4 is a view, partly in section and partly in elevation, taken in the direction of arrow 4 of FIGURE 3.
Figure 5:
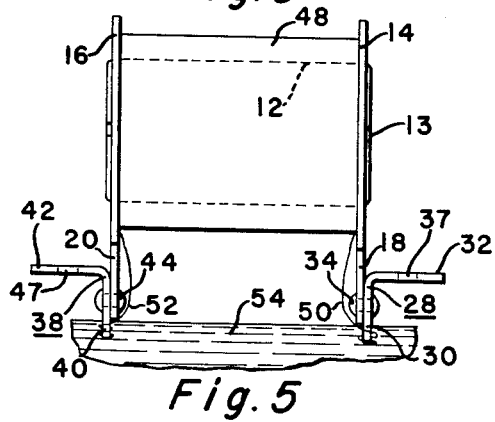
FIGURE 5 is a fragmentary view illustrating the manner in which the ends of the winding are connected to the terminals by dip soldering.

After the terminals 28 and 38 are attached to the tabs on the spool and flanges, a winding 48, as shown in FIGURES 3 and 4, is wound around the core 12. One end 50 of the winding is wrapped around the portion 30 of the terminal within the slot 36 before the coil is wound on the core. The other end 52 of the winding is wound around the portion 40 of the terminal 38 in a similar manner after the coil is wound on the core. The coil may be wound on the core in a conventional manner by placing the spool on a spindle, or other rotating element. Thereafter, the ends of the terminal portions 30 and 40 having the wires 50 and 52 wrapped thereabout are immersed in a pot of molten solder, as indicated by numeral 54 so as to obtain a good mechanical and electrical connection between the terminals and the ends of the windings.

Figure 6:
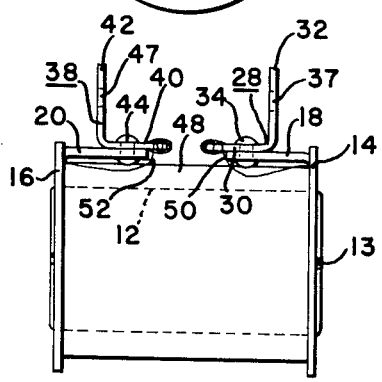
FIGURE 6 is a view in elevation of the coil after the terminal tabs have been soldered to the windings and after the tabs have been bent inwardly throughout the angle of substantially 90°.
Figure 7:
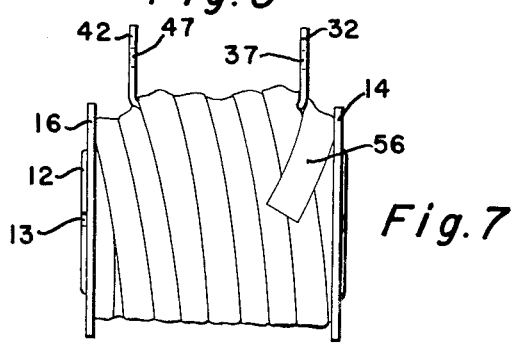
FIGURE 7 is a view of the completed coil assembly of the first embodiment of this invention wherein the terminal tabs are taped to the winding.

After the soldering operation, the tabs 18 and 20 are folded, or bent, throughout substantially 90°, and into engagement with the winding 48 as shown in FIGURE 6. The tabs 18 and 20 can be readily folded over since the end flanges 14 and 16 are formed with bend-lines, as aforementioned. Thereafter, the tabs 18 and 20 are secured to the winding by insulating tape 56, as shown in FIGURE 7, to complete the coil assembly.

Figure 8:
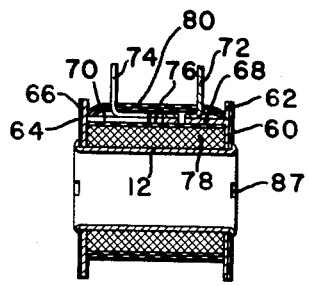
FIGURE 8 is a longitudinal sectional view of a coil constructed according to the second embodiment of this invention.
Figure 9:
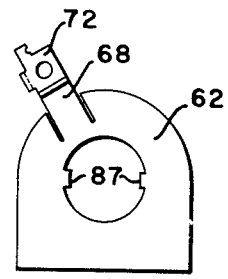
FIGURE 9 is an end view, in elevation, of an end flange used in the coil construction of FIGURE 8.

With reference to FIGURE 8, a modified coil construction is shown wherein a second insulating flange is interposed between the end of the core and the flange having the radially extending tab thereon. This flange is depicted by the numeral 60 and is incorporated to provide the proper insulation characteristics at the point where the notches are formed in the end flange 62 adjacent the radially extending tab. A similar insulating end flange 64 is positioned outwardly of the end flange 66 at the other end of the core 12. In the embodiment of FIGURES 8 and 9, the end flanges 62 and 66 may have their radially extending tabs angularly spaced as depicted in FIGURE 9. Thus, the radially extending tab 68 on the end flange 62 is angularly spaced from the radially extending tab 70 on the end flange 66. This arrangement is necessary where the length of the core 12 is insufficient to accommodate the tabs 68 and 70 in alignment. The terminals 72 and 74 attached to the tabs 60 and 70 are the same as the terminals hereinbefore described. In the FIGURE 8 embodiment, a piece of dielectric material 76, which conforms to the winding 78, is interposed between the tabs 68 and 70 and the winding to insulate the terminals from the winding. Thereafter, insulating tape 80 is wound around the coil assembly to hold the terminals in position.

Figure 10:
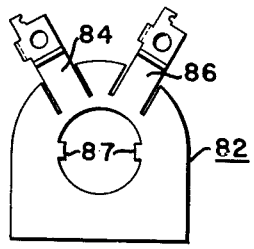
FIGURE 10 is an end view, in elevation, of a modified end flange constructed according to the third embodiment of this invention.

With particular reference to FIGURE 10, a modified end flange for the core 12 is shown. In the modified end flange, depicted by numeral 82, a pair of angularly spaced, radially extending tabs 84 and 86 are formed on the flange 82. This type of end flange is utilized where two coils are wound on the core. In both FIGURES 9 and 10, the inwardly extending tangs 87, for engaging the notches in the cylindrical core 12 are clearly shown.

Figure 11:
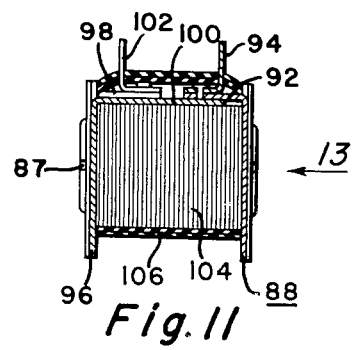
FIGURE 11 is a longitudinal sectional view of a coil construction in accordance with the fourth embodiment of this invention.
Figure 12:
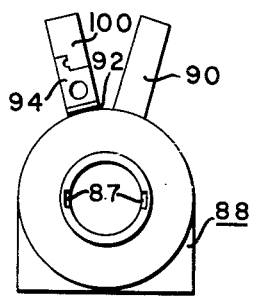
FIGURE 12 is an end view, in elevation, of the spool, or bobbin, assembly used in the coil construction of FIGURE 11.
Figure 13:
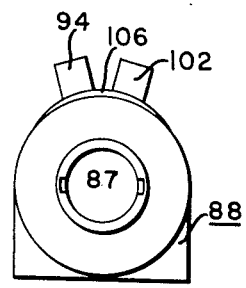
FIGURE 13 is an end view of the coil construction of FIGURE 11 taken in the direction of arrow 13 of FIGURE 11.

With particular reference to FIGURES 11 through 13, a further modification of the coil assembly of this invention is shown. In this modification as shown on FIGURE 12, each end flange 88 is formed with a pair of angularly spaced, radially extending tabs 90 and 92. A terminal 94 of the type hereinbefore described is secured to the tab 92. However, a terminal is not attached to the radially extending tab 90. The end flange 96 of the opposite end of the core is likewise formed with a pair of angularly spaced radially extending tabs 98 and 100. The tabs 100 and 90 are of greater radial extent than the tabs 92 and 98. In addition, a terminal 102 is attached to the tab 98. The tab 100 is aligned with the tab 92 on the end flange 88, while the tab 90 on the end flange 88 is aligned with the tab 98 on the end flange 96. Thus, after the coil 104 is wound around the core, and the ends of the winding 104 are attached to the terminals 94 and 102, and are affixed thereto by dip soldering, the tab 100 is bent through 90° and thereafter the tab 92 is bent on the top of the tab 100. In a similar manner, the tab 90 is bent after which the tab 98 is bent to lie over the tab 99. Thus, the auxiliary tabs 90 and 100 space the tabs 94 and 102 from the winding 104 so as to provide the necessary insulation therebetween. The coil assembly is then completed as aforedescribed by winding tape 106 about the winding to secure the terminals in position.

In the completed coil assemby, the terminal portions which extend radially from the winding facilitate the connection of the winding with an external circuit. Moreover, by attaching the terminals to tabs which are integral with the end flanges of the spool, a more rigid coil assembly can be produced. In addition, the manufacturing economies resulting from using the process of manufacturing coil assemblies as set forth in this invention greatly reduce the cost of the completed coil assemblies.

While the embodiments of the present invention as herein disclosed, constitute preferred forms, it is to be understood that other forms might be adopted.

What is claimed is as follows:

1. As an article of manufacture, a spool and terminal assembly for an electric coil including, a core of electrical insulating material having a flange at each end, each flange having a plurality of angularly spaced tabs extending outwardly therefrom, the tabs on said flanges being in axial alignment, said tabs being of different radial extent and a terminal attached to each tab of lesser radial extent.

2. A coil including, a spool having a core of electrically insulating material with a flange at each end, each flange having a tab, a terminal attached to each tab, each terminal having angularly arranged portions which extend substantially axially and radially of said core, a winding on said core having its ends attached to the axially extending portions of said terminals, said tabs extending towards the winding with the ends of the winding attached to said axially extending terminal portions, and means securing the tabs to the winding in engagement therewith.

3. A coil assembly including, a spool having a core of electrical insulating material with a flange at each end, each flange having at least one tab thereon, a terminal attached to each tab, each terminal having angularly arranged portions which extend substantially axially and radially of said core, a winding on said core having its ends attached to the axially extending portions of said terminals, a layer of dielectric material on said winding, said tabs extending towards the winding and over said dielectric material with the ends of the winding attached to the axially extending portion of said terminals, and means securing the tabs to the winding in engagement therewith.

4. A coil assembly including, a spool having a core of electrical insulating material with a flange at each end, each flange having a pair of tabs thereon, said tabs being of different lengths, a terminal attached to the shorter tab on each end of the flange, a winding on said core having its ends attached to said terminals, said longer tabs extending towards the winding, said shorter tabs overlying said longer tabs, and means securing the tabs to the winding in engagement therewith.

5. A coil including, a spool of electrical insulating material having a flange at each end, each flange having a pair of tabs thereon of different lengths, a terminal attached to the shorter tab, each terminal having angularly related portions which extend substantially axially and radially of said core, the shorter and longer tabs on opposite ends of said core being in alignment with each other, a winding on said core having its ends attached to said terminals, said longer tabs extending towards the winding, said shorter tabs with the terminals attached thereto overlying the longer tabs, and means securing the tabs to the windings in engagement therewith.

6. A coil comprising, a spool of electrical insulating material having a core with a flange at each end, each flange having a tab, an L-shaped terminal attached to each tab, a winding on said core having its ends attached to one leg of said terminals, said tab engaging said winding with the ends of the winding attached to said terminals, and means securing the tabs to the winding in engagement therewith.

References Cited in the file of this patent

UNITED STATES PATENTS

| | | |
|---|---|---|
| 1,100,178 | Forsberg | June 16, 1914 |
| 2,214,151 | Wagar | Sept. 10, 1940 |
| 2,264,832 | Ensign | Dec. 2, 1941 |
| 2,413,897 | Wilson | Jan. 7, 1947 |
| 2,434,511 | Osterman et al. | Jan. 13, 1948 |
| 2,455,355 | Combs | Dec. 7, 1948 |
| 2,471,869 | Gebel | May 31, 1949 |
| 2,488,468 | Dinion | Nov. 15, 1949 |
| 2,501,686 | Merkle | Mar. 28, 1950 |
| 2,649,558 | Franz | Aug. 18, 1953 |